(12) United States Patent
Wang (10) Patent No.: US 11,445,272 B2
(45) Date of Patent: Sep. 13, 2022

(54) VIDEO PROCESSING METHOD AND APPARATUS

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Junfu Wang, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 17/263,425

(22) PCT Filed: Jul. 24, 2019

(86) PCT No.: PCT/CN2019/097527
§ 371 (c)(1),
(2) Date: Jan. 26, 2021

(87) PCT Pub. No.: WO2020/020241
PCT Pub. Date: Jan. 30, 2020

(65) Prior Publication Data
US 2021/0314675 A1 Oct. 7, 2021

(30) Foreign Application Priority Data
Jul. 27, 2018 (CN) .......................... 201810843764.5

(51) Int. Cl.
*H04N 21/8549* (2011.01)
*G06F 16/735* (2019.01)
(Continued)

(52) U.S. Cl.
CPC ....... *H04N 21/8549* (2013.01); *G06F 16/735* (2019.01); *G06F 16/7867* (2019.01);
(Continued)

(58) Field of Classification Search
CPC ......... H04N 21/8549; H04N 21/43074; H04N 21/4884; G06N 20/00; G06F 16/7867; G06F 16/735; G06F 40/30
See application file for complete search history.

(56) References Cited

U.S. PATENT DOCUMENTS

| 5,664,227 A | 9/1997 | Mauldin et al. |
| 8,515,258 B2 | 8/2013 | Chaudhuri et al. |

(Continued)

FOREIGN PATENT DOCUMENTS

| CN | 1969552 A | 5/2007 |
| CN | 103150373 A | 6/2013 |

(Continued)

OTHER PUBLICATIONS

International Search Report dated Sep. 27, 2019 in PCT/CN2019/097527 filed on Jul. 24, 2019, 2 pages.
(Continued)

*Primary Examiner* — Thai Q Tran
*Assistant Examiner* — Jose M Mesa
(74) *Attorney, Agent, or Firm* — Oblon, McClelland, Maier & Neustadt, L.L.P.

(57) ABSTRACT

The present disclosure relates to the technical field of multimedia, and provides a video processing method and apparatus. The video processing method according to the present disclosure includes: performing semantic analysis on subtitles of a video to acquire compressed subtitles; determining a weight of each frame of images in the video based on a preset image processing strategy; acquiring a shortened video images by extracting a plurality of image
(Continued)

frames in an order of the weights of all frames of images from high to low, according to a preset video shortening proportion; and generating a shortened video according to the shortened video images and the compressed subtitles.

12 Claims, 6 Drawing Sheets

(51) Int. Cl.
*G06F 40/30* (2020.01)
*G06N 20/00* (2019.01)
*G06F 16/78* (2019.01)
*H04N 21/43* (2011.01)
*H04N 21/488* (2011.01)

(52) U.S. Cl.
CPC .............. *G06F 40/30* (2020.01); *G06N 20/00* (2019.01); *H04N 21/43074* (2020.08); *H04N 21/4884* (2013.01)

(56) References Cited

U.S. PATENT DOCUMENTS

| | | | |
|---|---|---|---|
| 9,171,578 B2 | 10/2015 | Lu et al. | |
| 9,286,938 B1 | 3/2016 | Tsely-Llin | |
| 10,153,001 B2 | 12/2018 | Lu et al. | |
| 2004/0125877 A1 | 7/2004 | Chang et al. | |
| 2007/0245379 A1 | 10/2007 | Agnihortri | |
| 2011/0305439 A1 | 12/2011 | Chaudhuri et al. | |
| 2012/0033949 A1 | 2/2012 | Lu et al. | |
| 2014/0112642 A1* | 4/2014 | Bae ..................... | H04N 9/8233 386/244 |
| 2016/0029106 A1* | 1/2016 | Chen .................... | G06F 16/738 386/282 |
| 2016/0111130 A1 | 4/2016 | Lu et al. | |
| 2019/0066732 A1 | 2/2019 | Lu et al. | |

FOREIGN PATENT DOCUMENTS

| | | | |
|---|---|---|---|
| CN | 105761263 A | 7/2016 | |
| CN | 106888407 A | 6/2017 | |
| CN | 107943990 A | 4/2018 | |
| WO | WO 2005/125201 A1 | 12/2005 | |

OTHER PUBLICATIONS

Combined Chinese Office Action and Search Report dated Jan. 4, 2021 in Chinese Application No. 201810843764.5 filed on Jul. 27, 2018, 10 pages.

Extended European Search Report dated Mar. 28, 2022 in European Patent Application No. 19841881.6, 10 pages.

Dong, P., et al., "An iteratively reweighting algorithm for dynamic video summarization". Multimedia Tools and Applications, vol. 74, No. 21, Jun. 27, 2014, XP035549162, pp. 9449-9473.

Lu. S., et al., "A Novel Video Summarization Framework for Document Preparation and Archival Applications", Aerospace Conference, 2005 IEEE, Mar. 5, 2005, XP031213708, pp. 1-10.

* cited by examiner

VIDEO PROCESSING METHOD AND APPARATUS

CROSS REFERENCE TO RELATED APPLICATIONS

The present disclosure is a U.S. National Stage Application under 35 U.S.C. § 371 of International Patent Application No. WOCN19097527, filed on Jul. 24, 2019, which is based on and claims priority of Chinese application for invention No. CN201810843764.5, filed on Jul. 27, 2018, the disclosure of both of which are hereby incorporated into this disclosure by reference in its entirety.

TECHNICAL FIELD

This disclosure relates to the technology field of multimedia, and in particular, to a video processing method and apparatus.

BACKGROUND

As the pace of life speeds up, people increasingly hope to acquire more information in limited fragmentation time, and information are acquired by texts, images, videos and the like. At present, videos are important sources for us to acquire information quickly, and meanwhile, we have higher and higher requirements on ways of playing and watching the videos.

In order to improve an information acquisition efficiency in a video watching process, a player provides two solutions:

(1) a fast forward solution in which, in a video player, a user may slide a screen left and right, or click left and right keys on a keyboard to achieve fast forward and fast backward effects, and also directly drag a progress bar to achieve the effects;

(2) a double-speed solution in which, the user may select a playing speed on a display interface of the video player to achieve the effect of quick play.

SUMMARY

According to some embodiments of the present disclosure, there is provided a video processing method, comprising: performing semantic analysis on subtitles of a video to acquire compressed subtitles; determining a weight of each frame of images in the video based on a preset image processing strategy; acquiring a shortened video images by extracting a plurality of image frames in an order of the weights of all frames of images from high to low, according to a preset video shortening proportion; and generating a shortened video according to the shortened video images and the compressed subtitles.

In some embodiments, that generating a shortened video comprises: determining a position of each image frame of the shortened video images in an original video time axis; determining positions of original subtitles corresponding to each compressed subtitle in the original video time axis; and synchronizing a playing progress of the shortened video images with that of the compressed subtitles according to the original video time axis, to generate the shortened video.

In some embodiments, the preset image processing strategy comprises: determining a weight assignment strategy according to a type tag of the video; and performing one or more of the following operations according to the weight assignment strategy: increasing a weight of each close-up image frame according to the weight assignment strategy; increasing a weight of each facial expression image frame according to the weight assignment strategy; or, increasing a weight of each wide-angle image frame according to the weight assignment strategy.

In some embodiments, the video processing method further comprises: adjusting the weight of each frame of images according to video playing behavior information of a user; and re-generating the shortened video images according to all the image frames after the weight of each frame of images is adjusted, so as to update the shortened video.

In some embodiments, the video processing method further comprises: for a single user: acquiring playing behavior information of a user on videos with a same type tag, and updating the weight assignment strategy of the user on the videos with the same type tag according to the playing behavior information of the user; adjusting a weight of each image frame in the videos with the same type tag according to the updated weight assignment strategy; and generating a user personalized shortened video images according to all the image frames after the weight of each frame of images is adjusted, so as to generate a user personalized shortened video.

In some embodiments, the video processing method further comprises: updating a weight assignment strategy for a type of users, according to playing behavior information of the type of users on one of a same video and videos with a same type tag; adjusting a weight of each image frame in all videos having the same type tag which corresponds to the one of the same video and the videos with the same type tag, according to a updated weight assignment strategy; and generating a user type personalized shortened video images according to all the image frames after the weight of each frame of images is adjusted, so as to generate a user type personalized shortened video.

In some embodiments, the video processing method further comprises: determining watching preferences of users by collecting the playing behavior information of the users; determining similarities among the users according to the watching preference information of the users; and determining the users with a similarity which exceeds a preset threshold as the same type of users.

In some embodiments, the video processing method further comprises: adjusting a weight of each image frame through an item-based collaborative filtering algorithm and a machine learning algorithm, and generating the shortened video images according to all the image frames after the weight of each frame of images is adjusted, so as to update the shortened video.

According to still other embodiments of the present disclosure, there is provided a video processing apparatus, comprising: a processor; and a memory coupled to the processor and storing instructions that when executed by the processor, cause the processor to: perform semantic analysis on subtitles of a video to acquire compressed subtitles; determine a weight of each frame of images in the video based on a preset image processing strategy; acquire a shortened video images by extracting a plurality of image frames in an order of the weights of all frames of images from high to low, according to a preset video shortening proportion; and generate a shortened video according to the shortened video images and the compressed subtitles.

In some embodiments, generating a shortened video comprises: determining a position of each image frame of the shortened video images in an original video time axis; determining positions of original subtitles corresponding to each compressed subtitle in the original video time axis; and synchronizing a playing progress of the shortened video images with that of the compressed subtitles according to the original video time axis, to generate the shortened video.

In some embodiments, the preset image processing strategy comprises: determining a weight assignment strategy according to a type tag of the video; and performing one or more of the following operations according to the weight assignment strategy: increasing a weight of each close-up image frame according to the weight assignment strategy; increasing a weight of each facial expression image frame according to the weight assignment strategy; or, increasing a weight of each wide-angle image frame according to the weight assignment strategy.

In some embodiments, the memory further storing instructions that when executed by the processor, cause the processor to: adjust the weight of each frame of images according to video playing behavior information of a user; and re-generate the shortened video images according to all the image frames after the weight of each frame of images is adjusted, so as to update the shortened video.

In some embodiments, the memory further storing instructions that when executed by the processor, cause the processor to: acquire playing behavior information of a user on videos with a same type tag, and updating the weight assignment strategy of the user on the videos with the same type tag according to the playing behavior information of the user; adjust a weight of each image frame in the videos with the same type tag according to the updated weight assignment strategy; and generate a user personalized shortened video images according to all the image frames after the weight of each frame of images is adjusted, so as to generate a user personalized shortened video.

In some embodiments, the memory further storing instructions that when executed by the processor, cause the processor to: update a weight assignment strategy for a type of users, according to playing behavior information of the type of users on one of a same video and videos with a same type tag; adjust a weight of each image frame in all videos having the same type tag which corresponds to the one of the same video and the videos with the same type tag, according to a updated weight assignment strategy; and generate a user type personalized shortened video images according to all the image frames after the weight of each frame of images is adjusted, so as to generate a user type personalized shortened video.

In some embodiments, the memory further storing instructions that when executed by the processor, cause the processor to: determine watching preferences of users by collecting the playing behavior information of the users; determine similarities among the users according to the watching preference information of the users; and determine the users with a similarity which exceeds a preset threshold as the same type of users.

In some embodiments, the memory further storing instructions that when executed by the processor, cause the processor to: adjust a weight of each image frame through an item-based collaborative filtering algorithm and a machine learning algorithm, and generating the shortened video images according to all the image frames after the weight of each frame of images is adjusted, so as to update the shortened video.

According to further embodiments of the present disclosure, there is provided a computer-readable storage medium storing computer instructions which, when executed by a processor, cause a processor to: perform semantic analysis on subtitles of a video to acquire compressed subtitles; determine a weight of each frame of images in the video based on a preset image processing strategy; acquire a shortened video images by extracting a plurality of image frames in an order of the weights of all frames of images from high to low, according to a preset video shortening proportion; and generate a shortened video according to the shortened video images and the compressed subtitles.

In some embodiments, generating a shortened video comprises: determining a position of each image frame of the shortened video images in an original video time axis; determining positions of original subtitles corresponding to each compressed subtitle in the original video time axis; and synchronizing a playing progress of the shortened video images with that of the compressed subtitles according to the original video time axis, to generate the shortened video.

In some embodiments, the storage medium further storing computer instructions which, when executed by a processor, cause the processor to: adjust the weight of each frame of images according to video playing behavior information of a user; and re-generate the shortened video images according to all the image frames after the weight of each frame of images is adjusted, so as to update the shortened video.

In some embodiments, the storage medium further storing computer instructions which, when executed by a processor, cause the processor to: acquire playing behavior information of a user on videos with a same type tag, and updating the weight assignment strategy of the user on the videos with the same type tag according to the playing behavior information of the user; adjust a weight of each image frame in the videos with the same type tag according to the updated weight assignment strategy; and generate a user personalized shortened video images according to all the image frames after the weight of each frame of images is adjusted, so as to generate a user personalized shortened video.

BRIEF DESCRIPTION OF TEE DRAWINGS

The accompanying drawings described herein are used to provide a further understanding of the present disclosure and constitute a part of this disclosure, and the illustrative embodiments of the present disclosure and the description thereof serve to explain but not to improperly limit the present disclosure. In the drawings.

DETAILED DESCRIPTION

The technical solutions of the present disclosure are further described in detail below with reference to the accompanying drawings and the embodiments.

The inventor found that: the fast forward solution in the related art needs continuous human intervention and continuous forward or backward sliding to meet the watching effect, but missed content must be played back to watch again. As a result, a user cannot watch video content with concentration, the obtained storylines are also discontinuous, user experience is poor, and key content is easy to miss. Thus, the user spends time but cannot effectively achieve the effect of quick view.

In the double-speed solution, the maximum speed is usually 2× speed, and playing below the 2× speed still consumes a lot of time of a user, for example, for a 40-minute episode of a TV series, even if the speed is 1.5× speed, it still takes 27 minutes; if a video is played at a 2× speed, the user is required to have high listening and understanding abilities, and the user must be always in a state of high concentration and mental stress, so that pleasures of watching the video are lost.

Figure 1:
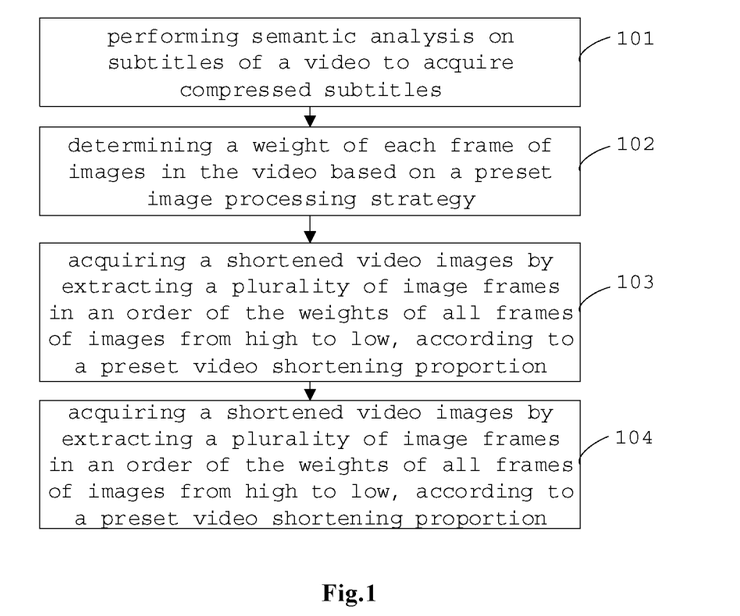
FIG. 1 is a flowchart of an image processing method according to some embodiments of the present disclosure.

A flowchart of an image processing method according to some embodiments of the present disclosure is shown in FIG. 1.

Step 101, performing semantic analysis on subtitles of a video to acquire compressed subtitles. In some embodiments, all subtitles of the current video may be acquired, and NLU (Natural Language Understanding) may be performed on the subtitles, to compress and summarize narrative structures, storylines, etc. of the video. New subtitles are formed through syntactic analysis, information extraction and language organization, and they comprise a complete narrative plot. In some embodiments, a length of the compressed subtitles can be controlled as needed, for example, making it about one quarter of a length of the original subtitles.

Step 102, determining a weight of each frame of images in the video based on a preset image processing strategy. In some embodiments, each frame in the video may be analyzed, for example: tagging a shot as a wide-angle or close-up one, and tagging which characters and roles are included in these shots, and identifying happiness, anger, sadness, and joy in their facial emotions. The video content is splitting into images according to dimensionality of the frame, and then the images are tagged, for example: wide-angle shots, close-up shots, character facial expressions such as happiness, anger, sadness, and joy, and lead and supporting roles and a passer-by appearing in the video. In some embodiments, different weights may be set for different video frames according to the tags, subtitles, and picture settings of the video.

Step 103, acquiring a shortened video images by extracting a plurality of image frames in an order of the weights of all frames of images from high to low, according to a preset video shortening proportion.

Step 104, generating a shortened video according to the shortened video images and the compressed subtitles, for example, combining the images and audios, controlling the two to be played synchronously, and forming the shortened video.

Through such a method, the compressed subtitles matching the subject content of the video can be generated, important frames in the video can be extracted, the shortened video can be automatically generated for a user to watch, for example, a 40-minute episode of a TV series is shortened to 10 minutes, a 2-hour movie is shortened to 30 minutes, the content to be mainly expressed by the video is retained in the shortened video, so that watching efficiency and information acquisition efficiency of the user are greatly increased, and user experience is improved.

Figure 2:
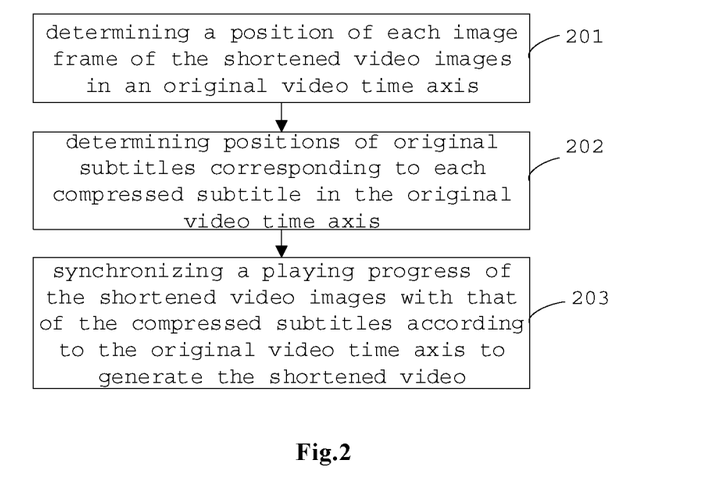
FIG. 2 is a flowchart for audio and image match in an image processing method according to some embodiments of the present disclosure.

In some embodiments, in order to ensure that audios and images of the video are played synchronously, a flowchart for audio and image match in the image processing method according to some embodiments of the present disclosure is shown in FIG. 2.

Step 201, determining a position of each image frame of the shortened video images in an original video time axis.

Step 202, determining positions of original subtitles corresponding to each compressed subtitle in the original video time axis. In some embodiments, since the subtitles are compressed, a time period of the original video time axis corresponding to each subtitle is acquired.

Step 203, synchronizing a playing progress of the shortened video images with that of the compressed subtitles according to the original video time axis, to generate the shortened video.

In some embodiments, if a time point of an image frame in the time axis falls within a range of a time period corresponding to a certain subtitle, the subtitle is played synchronously with the image frame.

In some embodiments, if the time point of the image frame in the time axis does not fall within the range of the time period corresponding to any of the compressed subtitles, other image frames are caused to be played synchronously with the corresponding subtitles by reducing audio playing speed, or increasing pauses, inserting background sounds, etc.

In some embodiments, if there is no selected image frame in the time period corresponding to the subtitle, an appropriate number of image frames may be selected to play from the time period corresponding to the subtitle according to weights of the image frames.

In this way, synchronization of progresses between the subtitles and the images can be ensured as far as possible, which facilitates the user to understand the video, improves quality of the shortened video, and improves user experience.

In some embodiments, in the process of acquiring the compressed subtitles, word to vector modeling can be adopted to understand semantics of each word according to the context, and to re-extract and summarize the subtitles with same semantics; a supervised learning method is adopted for semantic representation, because unsupervised learning cannot perform understanding of a scene, for example, subtitles: "whose dream is travelling around the world?" and "who has the dream of travelling around the world?"; for unsupervised learning, the two subtitles are identical but in fact different; for the order of the context, time series should be considered, and a LSTM (Long Short-Term Memory) in a RNN (Recurrent Neural Network) model utilizes time characteristics of an event in a past period to predict characteristics of the event in a future period. In some embodiments, for semantic skewing caused by uneven text distribution of the subtitles, a TF_IDF (Term Frequency-Inverse Document Frequency) concept is fused on the word2vector model, to perform a semantic smoothing process, and to perform dimensionality reduction if necessary.

In this way, it enables to correctly understand and appropriately condense semantics, so that the compressed subtitles is ensured to keep more important information relative to the original subtitles, and to express the original subtitles correctly, and user experience is improved.

In some embodiments, different image weight setting strategies may be set for different regions, styles, and/or types of videos. For example, the videos may be classified into, Chinese, Hong Kong, Europe and America, Japanese and Korean, etc., according to regions; into comedy, tragedy, love, action, gunfight, thriller, suspense, etc., according to types; and into sweet, wild, worth seeing, artificial intelligence, robots, etc., according to styles. Different regions, styles and/or types of the videos may be set to filter different content, for example: love films pay more attention to storylines, so that a targeted increase of weights of the storylines and close-up shots of characters is made; gunfight films pay more attention to fighting scenes, so that a targeted increase of weights of the fighting scenes is made; suspense films have higher requirements on scenes and sound effects, so that a targeted increase of weights of the scenes with a slower change is increased. In some embodiments, video classification information is manually added when video data is recorded, and the videos can be directly read; tags can be selected while the user is watching a video, according to the video content and his own experience, and can be added by himself when there are no suitable selections. Then, the tags of the user are classified by using a K-means clustering algorithm, to select a tag closest to the center as the tag of the video, and update the tag according to a preset frequency, thereby improving time axis. In some embodiments, video images may be trained by an image recognition system (e.g., an open source model TensorFlow), and finally, by combining training results with the classification and tag of the video, corresponding plot segments are recognized.

In this way, the image weight setting strategy can be adjusted according to characteristics of different videos, so that the shortened videos better match the characteristics of videos of corresponding regions, styles and/or types, information retention of the shortened videos for the original videos is improved, key information is highlighted, and user experience is improved.

Figure 3A:
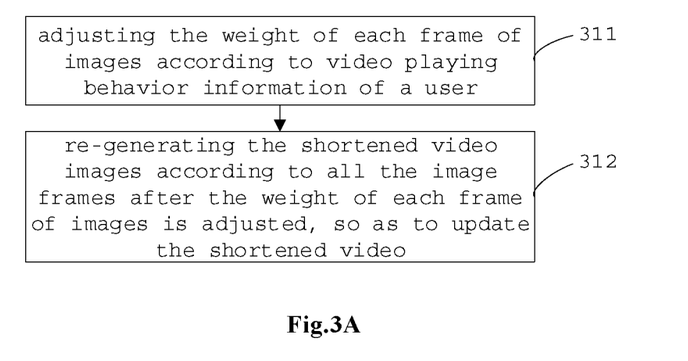
FIG. 3A is a flowchart of image frame weight adjustment in an image processing method according to some embodiments of the present disclosure.

In some embodiments, when a video is initially put on shelf, a shortened video can be generated through the above method, and then adjusted according to watching behaviors of a user, so as to form a shortened video more meeting needs of the user. A flowchart of image frame weight adjustment in an image processing method according to some embodiments of the present disclosure is shown in FIG. 3A.

Step 311, adjusting the weight of each frame of images according to video playing behavior information of a user. In some embodiments, the video behaviors of the user are recorded, e.g., where does the user fast-forward the played video; where to play quickly; where to review the content; where to stay, and how long to stay. In some embodiments, collection of the user behaviors may be achieved by capturing mouse click events and recording positions of video time axis scroll. For fast-forwarded image frames, this part of video information can be considered to be unimportant, and the weight thereof is reduced; for reviewed image frames, the weight thereof is increased; for image frames stayed longer (but within a preset range, to prevent importance determination of the image frames from being affected because the user leaves and pauses the video), the weight of the image frames is increased (it may be set that when the stay time is within a preset time range, the longer the stay time, the greater the weight), etc.

Step 312, re-generating the shortened video images according to all the image frames after the weight of each frame of images is adjusted, so as to update the shortened video.

In this way, characteristics collection can be performed for watching behaviors of the user on a same video, and the feedback of image frame importance from the user is obtained by analyzing the playing behaviors of the user, so that personalized image frame weight analysis on the video itself is realized, the accuracy of image frame extraction is improved, and the shortened video is further optimized to meet user requirements.

Figure 3B:
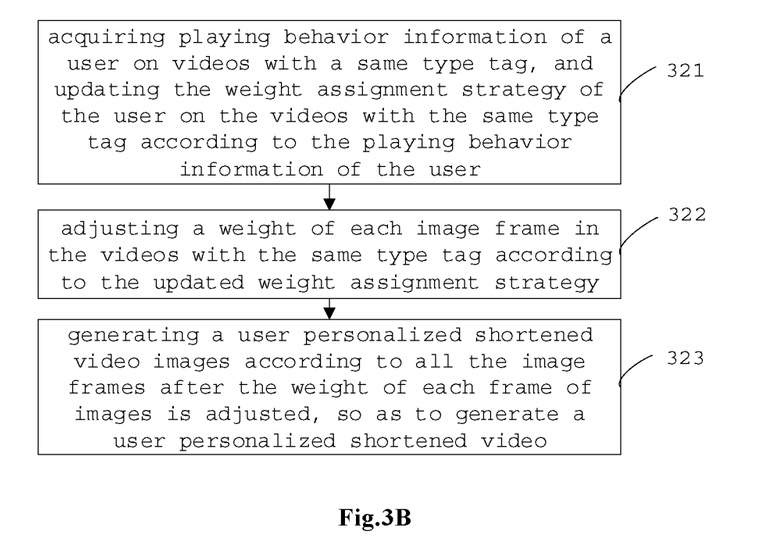
FIG. 3B is a flowchart of image frame weight adjustment in an image processing method according to other embodiments of the present disclosure.

In some embodiments, since different users have different video watching habits and focus on different links, the shortened video provided for the user can be adjusted according to playing habits of the user himself. A flowchart of image frame weight adjustment in an image processing method according to other embodiments of the present disclosure is shown in FIG. 3B.

Step 321, acquiring playing behavior information of a user on videos with a same type tag, and updating the weight assignment strategy of the user on the videos with the same type tag according to the playing behavior information of the user. For example, if both videos are TV series, and both are time-travel TV series, and court TV series, the two videos have high similarity and can be classified as the videos with the same type tag. For another example, for a same TV series, although each episode is a different video, it has a certain consistency and similarity, and shortened videos of unwatched videos can be adjusted according to the playing behaviors of the user on several watched episodes.

In some embodiments, for the playing behaviors of the user on the videos with the same type, e.g., preferring close-up shots, fighting scenes, etc., the weight of the image frames of the type of scene should be increased; if the user performs operations such as fast forward and skip on some image frames, the weight of the image frames with the image frame type to which these image frames belong, should be reduced.

Step 322, adjusting a weight of each image frame in the videos with the same type tag according to the updated weight assignment strategy.

Step 323, generating a user personalized shortened video images according to all the image frames after the weight of each frame of images is adjusted, so as to generate a user personalized shortened video.

In this way, personal preferences of a same user can be analyzed, and a user personalized weight assignment strategy is generated, so that an image shortening operation self-adaptive to the user is realized, attraction of the video to each user is ensured, and user experience is further improved.

Figure 3C:
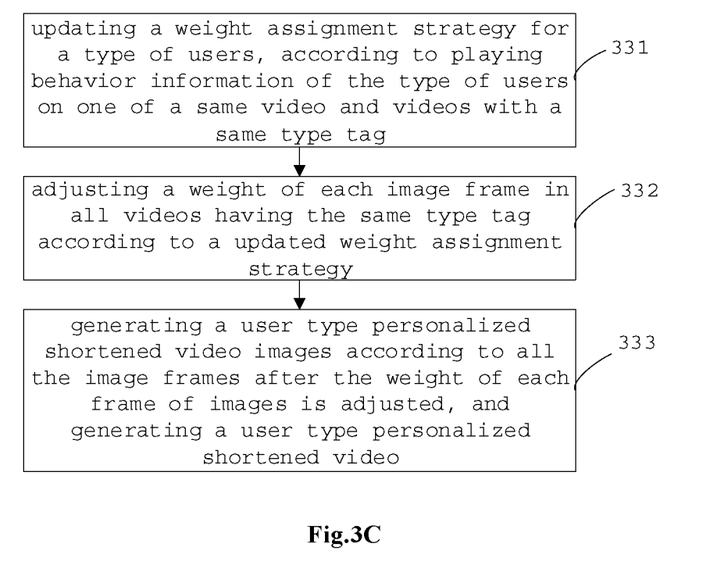
FIG. 3C is a flowchart of image frame weight adjustment in an image processing method according to still other embodiments of the present disclosure.

A flowchart of image frame weight adjustment in an image processing method according to still other embodiments of the present disclosure is shown in FIG. 3C.

Step 331, updating a weight assignment strategy for a type of users, according to playing behavior information of the type of users on one of a same video and videos with a same type tag. In some embodiments, by collecting the playing behavior information of the users, watching preference information of users are determined, similarities among different users are determined according to the watching preference information of the users, and then the users with a similarity which exceeds a preset threshold are determined as the same type of users.

Step 332, adjusting a weight of each image frame in all videos having the same type tag which corresponds to the one of the same video and the videos with the same type tag, according to a updated weight assignment strategy.

Step 333, generating a user type personalized shortened video images according to all the image frames after the weight of each frame of images is adjusted, so as to generate a user type personalized shortened video.

Because behaviors of part of users have certain similarities, by using the playing behaviors of the users of the same type, a personalized shortened video for the users of the type can be generated, so that problems of insufficient basic data and great accidental influence caused by limited playing behaviors of a single user are reduced, and the personalized adaptability of the shortened video to the user is improved.

Figure 4:
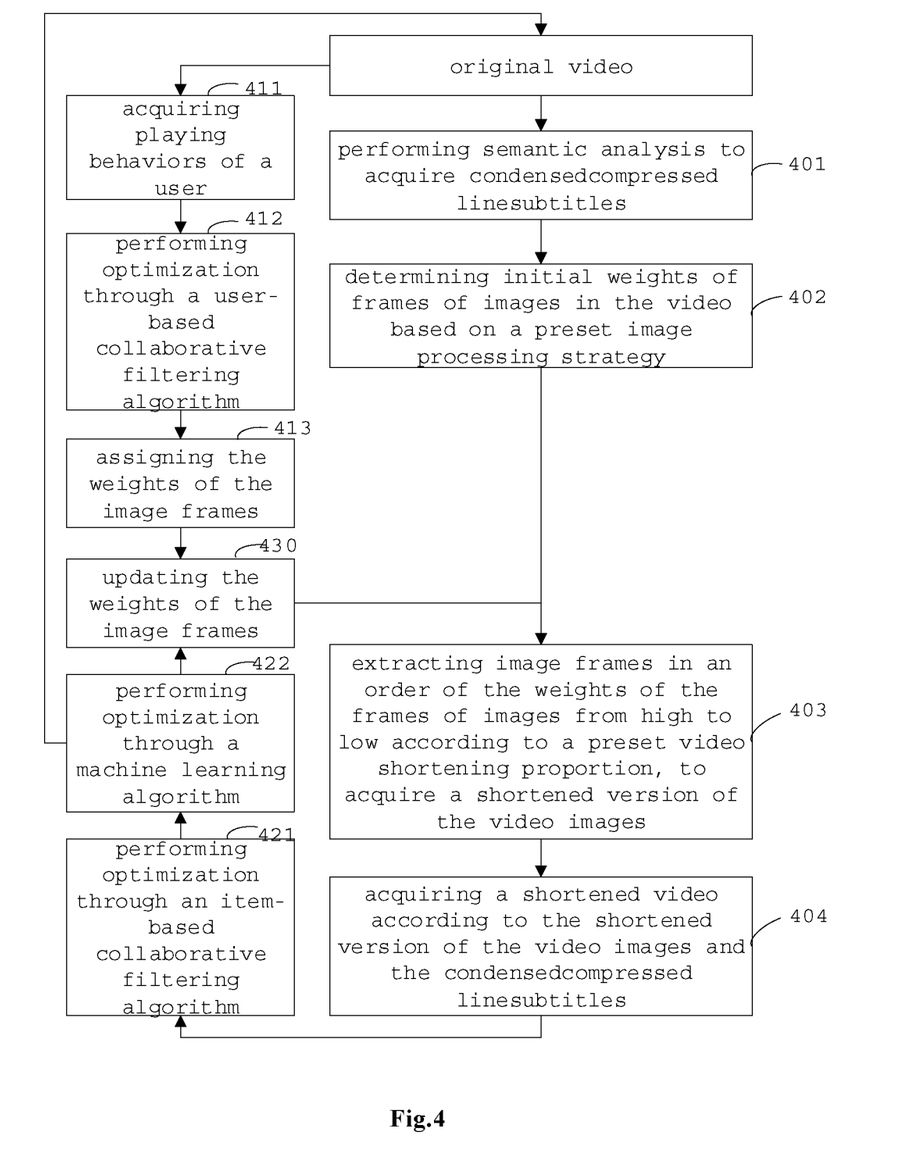
FIG. 4 is a flowchart of an image processing method according to further embodiments of the present disclosure.

A flow chart of an image processing method according to further embodiments of the present disclosure is shown in FIG. 4.

Step 401, in a cold start stage, performing semantic analysis on subtitles of a video to acquire compressed subtitles. In some embodiments, a length of the compressed subtitles may be controlled according to a length of a target video.

Step 402, determining weights of frames of images in the video based on a preset image processing strategy. In some embodiments, a weight of each close-up image frame is increased according to the weight assignment strategy; a weight of each facial expression image frame is increased according to the weight assignment strategy; and a weight of each wide-angle image frame is increased according to the weight assignment strategy. In some embodiments, the amount of weight adjustment may be determined according to the weight assignment strategy corresponding to a video tag.

Step 403, extracting the image frames in an order of the weights of the frames of images from high to low according to a preset video shortening proportion, to acquire a shortened version of the video images.

Step 404, acquiring a shortened video according to the shortened version of the video images and the compressed subtitles.

Step 411, acquiring playing behaviors of the user along with the use of the user.

Step 412, adjusting the weight of each image frame through a user-based collaborative filtering algorithm. Watching preferences of users for a certain video can be found through the collected user behavior data, and these preferences are measured and scored. A relationship between the users is calculated according to attitudes and preferences of different users on the same video, and videos with a same style are edited and integrated for the users with the same preferences.

Step 413, re-assigning the weights of the image frames, and then performing step 430. In some embodiments, the weight assignment may be adjusted based on the playing behaviors of the users in a manner of the embodiments related to FIGS. 3A and/or 3B.

Step 421, adjusting the weight of each image frame through an item-based collaborative filtering algorithm. A relationship between the videos is acquired by calculating the scores of different users on different videos. Based on the relationship between the videos, new plays and films of the same type can be edited and integrated according to the same solution. In some embodiments, the weight assignment may be adjusted based on playing behaviors of different users on the videos of the same type in the manner shown in the embodiments of FIG. 3A or 3C.

Step 422, determining the adjustment of the weight of each image frame through a machine learning algorithm. Weight parameters are continuously adjusted through the machine learning method, and video quality can be continuously improved.

In some embodiments, step 421 and step 422 may be performed in an interchangeable order.

Next, step 430 is performed.

Step 430, updating the weights of the image frames according to the configuration of the weights of the image frames in the cold start process, and in conjunction with the weight adjustment results of the steps 413 and 422. After weight updating is completed, step 403 is performed, so as to update the acquired shortened version of the video images and regenerate the shortened video.

In this way, according to different video types and styles, and in conjunction with people's preferences, a video is quickly filtered and processed, and only key content and main storylines are left, so that video watching efficiency of people is improved, watching time is saved, and people is caused to acquire more information in unit time.

Figure 5:
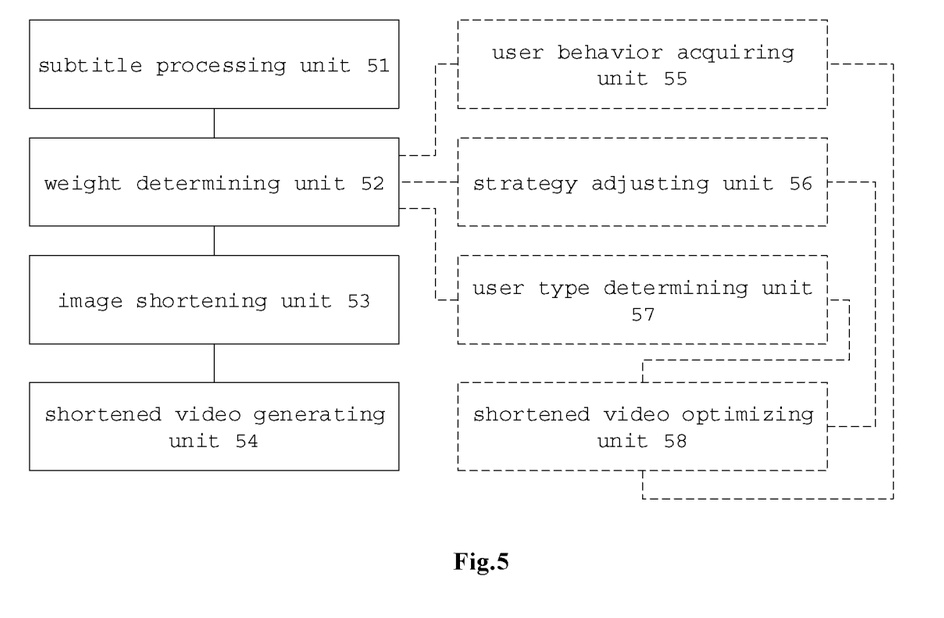
FIG. 5 is a schematic diagram of an image processing apparatus according to some embodiments of the present disclosure.

A schematic diagram of an image processing apparatus according to some embodiments of the present disclosure is shown in FIG. 5. The image processing apparatus comprises a subtitle processing unit 51, a weight determining unit 52, an image shortening unit 52, and a shortened video generating unit 54.

The subtitle processing unit 51 can perform semantic analysis on subtitles of a video to acquire compressed subtitles. In some embodiments, all subtitles of the current video may be acquired, NLU semantic understanding may be performed on the subtitles, and narrative structures, storylines, etc. of the video may be compressed and summarized. The weight determining unit 52 can determine a weight of each frame of images in the video based on a preset image processing strategy. The image shortening unit 53 can acquire a shortened video images by extracting a plurality of image frames in an order of the weights of all frames of images from high to low, according to a preset video shortening proportion. The shortened video generating unit 54 can generate a shortened video according to the shortened video images and the compressed subtitles, for example, combining the images and audios, and controlling the two to play synchronously, and thus, forming the shortened video.

Such a video processing apparatus can generate compressed subtitles matching the subject content of the video, extract important frames in the video, automatically generate a shortened video for a user to watch, enable the user to efficiently acquire effective information of the video and improve user experience.

In some embodiments, the shortened video generating unit 54 can determine a position of each image frame of the shortened video images in an original video time axis; determine positions of original subtitles corresponding to each compressed subtitle in the original video time axis; and synchronize a playing progress of the shortened video images with that of the compressed subtitles according to the original video time axis, to generate the shortened video, so that synchronization of progresses of the subtitles and the images can be ensured as much as possible, which facilitates user to understand the video, improves the shortened video quality, and advances user experience.

In some embodiments, the weight determining unit 52 can further adjust the weight of each frame of images according to video playing behavior information of a user; the image shortening unit 53 can further re-generating the shortened video images according to all the image frames after the weight of each frame of images is adjusted, so as to update the shortened video.

Such an apparatus can collect characteristics for watching behaviors of the user on a same video, and obtain the feedback of image frame importance from the user by analyzing the playing behaviors of the user, so that personalized image frame weight analysis on the video itself is implemented, the accuracy of image frame extraction is improved, and the shortened video is further optimized to meet user requirements.

In some embodiments, the video processing apparatus may further comprise a user behavior acquiring unit 55, which can acquire playing behavior information of a user on videos with a same type tag, and updating the weight assignment strategy of the user on the videos with the same type tag according to the playing behavior information of the user. The weight determining unit 52 can further adjust a weight of each image frame in the videos with the same type tag according to the updated weight assignment strategy; the image shortening unit 53 can further generate a user personalized shortened video images according to all the image frames after the weight of each frame of images is adjusted, so that the shortened video generating unit generates a user personalized shortened video.

Such an apparatus can analyze personal preferences of a same user and generate a user personalized weight assignment strategy, so that an image shortening operation self-adaptive to the user is realized, attraction of the video to each user is ensured, and user experience is further improved.

In some embodiments, the video processing apparatus may further comprise a strategy adjustment unit 56, which can update a weight assignment strategy for a type of users, according to playing behavior information of the type of users on one of a same video and videos with a same type tag; the weight determining unit 52 can further adjust a weight of each image frame in all videos having the same type tag which corresponds to the one of the same video and the videos with the same type tag, according to a updated weight assignment strategy; the image shortening unit 53 can further generate a user type personalized shortened video images according to all the image frames after the weight of each frame of images is adjusted, so as to generate a user type personalized shortened video. In some embodiments, the video processing apparatus may further comprise a user type determining unit 57, which can determine watching preferences of users by collecting the playing behavior information of the users; determine similarities among the users according to the watching preference information of the users; and determine the users with a similarity which exceeds a preset threshold as the same type of users, thereby facilitating the strategy adjusting unit to update the weight assignment strategy for the users of this type.

Such an apparatus can, by using the playing behaviors of the same type of users, generate a personalized shortened video for the users of the type, thereby reducing problems of insufficient basic data and great accidental influence caused by limited playing behaviors of a single user and improving a personalized adaptability of the shortened video to the user.

In some embodiments, the video processing apparatus may further comprise a shortened video optimizing unit 58, which can adjust a weight of each image frame through an item-based collaborative filtering algorithm and a machine learning algorithm, and generating the shortened video images according to all the image frames after the weight of each frame of images is adjusted, so as to update the shortened video, thereby implementing continuous optimization of the shortened video, and self-adaptive adjustment and evolution of the shortened video for each user.

Figure 6:
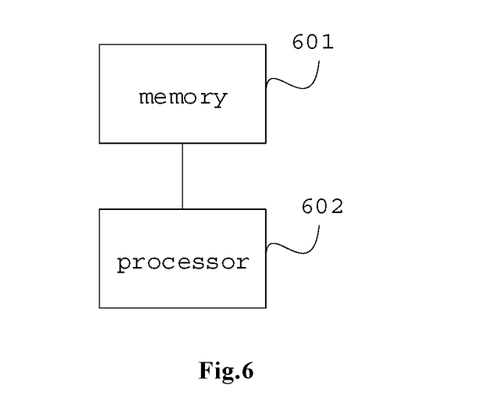
FIG. 6 is a schematic diagram of an image processing apparatus according to other embodiments of the present disclosure.

A schematic block diagram of an video processing apparatus according to some embodiments of the present disclosure is shown in FIG. 6. The video processing apparatus comprises a memory 601 and a processor 602, wherein the memory 601 may be a magnetic disk, flash memory, or any other non-volatile storage medium. The memory is configured to store instructions in the embodiments corresponding to the video processing methods above. A processor 602 is coupled to the memory 601, and may be implemented as one or more integrated circuits, such as a microprocessor or microcontroller. The processor 602 is configured to execute the instructions stored in the memory, and enables the user to efficiently acquire effective information of the video, thereby improving user experience.

Figure 7:
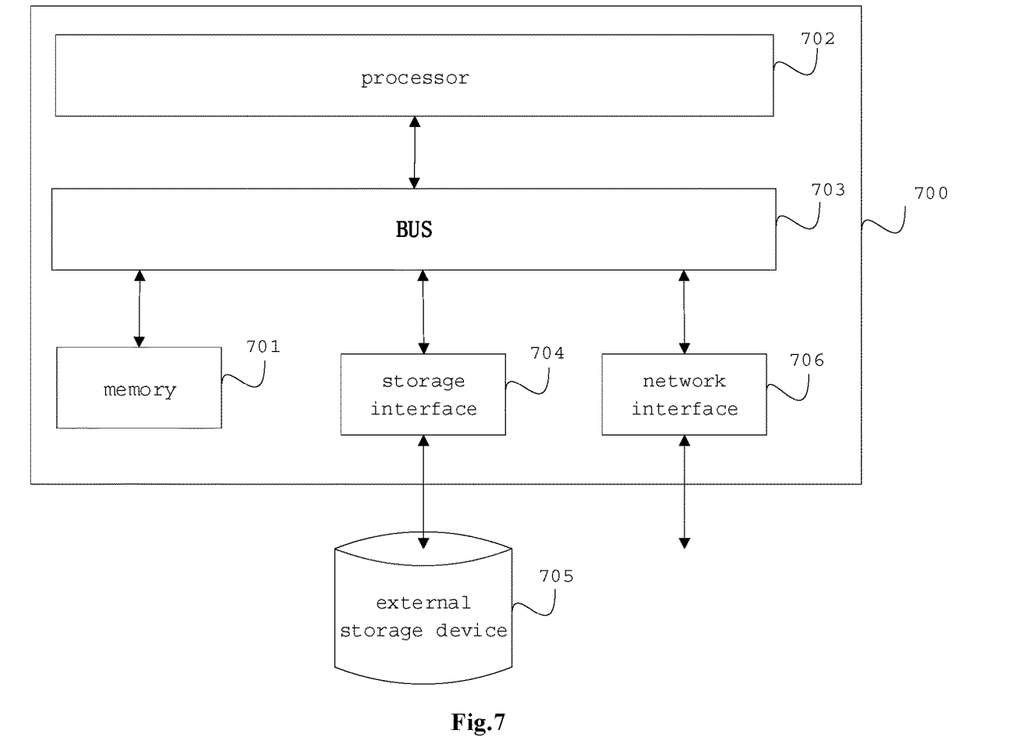
FIG. 7 is a schematic diagram of an image processing apparatus according to still other embodiments of the present disclosure.

In some embodiments, as also shown in FIG. 7, the video processing apparatus 700 comprises a memory 701 and a processor 702. The processor 702 is coupled to the memory 701 through BUS 703. The video processing apparatus 700 may be further connected to an external storage device 705 through a storage interface 704 so as to call external data, and to a network or another computer system (not shown) through a network interface 706. It will not be described in detail herein.

In the embodiment, by storing the data instructions in the memory and the processor processing the instructions, the user can be caused to efficiently acquire effective information of the video, thereby improving user experience.

In other embodiments, there is provided a computer-readable storage medium having stored thereon computer program instructions which, when executed by a processor, implement the steps of the methods in the embodiments corresponding to the video processing method. As will be appreciated by those skilled in the art, the embodiments of the present disclosure may be provided as methods, apparatuses, or computer program products. Accordingly, the present disclosure may take the form of an entirely hardware embodiment, an entirely software embodiment or an embodiment combining software and hardware aspects. Furthermore, the present disclosure may take the form of a computer program product embodied on one or more computer-usable non-transitory storage media (including, but not limited to, disk storage, CD-ROM, optical storage, and so forth) having computer-usable program code embodied therein.

The present disclosure is described with reference to flowcharts and/or block diagrams of methods, apparatuses (systems) and computer program products according to the embodiments of the present disclosure. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor, or other programmable data processing apparatus to produce a machine, such that the instructions, which are executed through the processor of the computer or other programmable data processing apparatus, create means for implementing functions specified in the flow or flows of the flowcharts and/or the block or blocks of the block diagrams.

These computer program instructions may also be stored in a computer-readable memory that can direct the computer or other programmable data processing apparatus to function in a particular manner, such that the instructions stored in the computer-readable memory produce an article of manufacture comprising instruction means which implements the functions specified in the flow or flows of the flowcharts and/or the block or blocks of the block diagrams.

These computer program instructions may also be loaded onto a computer or other programmable data processing apparatus to cause a series of operational steps to be performed on the computer or other programmable apparatus to produce a process implemented by the computer, such that the instructions executed on the computer or other programmable apparatus provide steps for implementing the functions specified in the flow or flows of the flowcharts and/or the block or blocks of the block diagrams.

Thus far, the present disclosure has been described in detail. Some details well known in the art have not been described in order to avoid obscuring the concepts of the present disclosure. Those skilled in the art can now fully appreciate how to implement the technical solution disclosed herein, in view of the foregoing description.

The method and apparatus of the present disclosure may be implemented in a number of ways. For example, the method and apparatus of the present disclosure may be implemented by software, hardware, firmware, or any combination of software, hardware, and firmware. The above-described order for the steps of the methods is for illustration only, and the steps of the methods according to the present disclosure are not limited to the order specifically described above unless specifically stated otherwise. Further, in some embodiments, the present disclosure may also be embodied as programs recorded in a recording medium, and these programs comprise machine-readable instructions for implementing the methods according to the present disclosure. Thus, the present disclosure also covers the recording medium storing the programs for executing the methods according to the present disclosure.

Finally, it should be noted that: the embodiments above are intended only to illustrate the technical solution of the present disclosure and not to limit it; although the present disclosure has been described in detail with reference to preferred embodiments, those of ordinary skill in the art will understand that: modifications to the specific embodiments of the present disclosure or equivalent substitutions for parts of the technical features may be made, all of which are intended to be covered by the scope of the claims of this disclosure without departing from the spirit thereof.

What is claimed is:

1. A video processing method, comprising:
performing semantic analysis on subtitles of a video to acquire compressed subtitles;
determining a weight of each frame of images in the video based on a preset image processing strategy;
acquiring a shortened video images by extracting a plurality of image frames in an order of the weights of all frames of images from high to low, according to a preset video shortening proportion; and
generating a shortened video according to the shortened video images and the compressed subtitles,
wherein the preset image processing strategy comprises:
determining a weight assignment strategy according to a type tag of the video; and
performing one or more of the following operations according to the weight assignment strategy:
increasing a weight of each close-up image frame according to the weight assignment strategy;
increasing a weight of each facial expression image frame according to the weight assignment strategy; or,
increasing a weight of each wide-angle image frame according to the weight assignment strategy.

2. A video processing method, comprising:
performing semantic analysis on subtitles of a video to acquire compressed subtitles;
determining a weight of each frame of images in the video based on a preset image processing strategy;
acquiring a shortened video images by extracting a plurality of image frames in an order of the weights of all frames of images from high to low, according to a preset video shortening proportion; and
generating a shortened video according to the shortened video images and the compressed subtitles,
wherein the video processing method further comprises:
adjusting the weight of each frame of images according to video playing behavior information of a user, and re-generating the shortened video images according to all the image frames after the weight of each frame of images is adjusted, so as to update the shortened video; or
adjusting a weight of each image frame through an item-based collaborative filtering algorithm and a machine learning algorithm, and generating the shortened video images according to all the image frames after the weight of each frame of images is adjusted, so as to update the shortened video; or
acquiring playing behavior information of a user on videos with a same type tag, and updating the weight assignment strategy of the user on the videos with the same type tag according to the playing behavior information of the user, adjusting a weight of each image frame in the videos with the same type tag according to the updated weight assignment strategy, and generating a user personalized shortened video images according to all the image frames after the weight of each frame of images is adjusted, so as to generate a user personalized shortened video.

3. A video processing method, comprising:
performing semantic analysis on subtitles of a video to acquire compressed subtitles;
determining a weight of each frame of images in the video based on a preset image processing strategy;
acquiring a shortened video images by extracting a plurality of image frames in an order of the weights of all frames of images from high to low, according to a preset video shortening proportion; and
generating a shortened video according to the shortened video images and the compressed subtitles,
wherein the video processing method further comprises:
updating a weight assignment strategy for a type of users, according to playing behavior information of the type of users on one of a same video and videos with a same type tag;
adjusting a weight of each image frame in all videos having the same type tag which corresponds to the one of the same video and the videos with the same type tag, according to a updated weight assignment strategy; and
generating a user type personalized shortened video images according to all the image frames after the weight of each frame of images is adjusted, so as to generate a user type personalized shortened video.

4. The video processing method according to claim 3, further comprising:
determining watching preferences of users by collecting the playing behavior information of the users;
determining similarities among the users according to the watching preference information of the users; and determining the users with a similarity which exceeds a preset threshold as the same type of users.

5. A video processing apparatus, comprising:
a processor; and
a memory coupled to the processor and storing instructions that when executed by the processor, cause the processor to:
perform semantic analysis on subtitles of a video to acquire compressed subtitles;
determine a weight of each frame of images in the video based on a preset image processing strategy;
acquire a shortened video images by extracting a plurality of image frames in an order of the weights of all frames of images from high to low, according to a preset video shortening proportion; and
generate a shortened video according to the shortened video images and the compressed subtitles,
wherein the preset image processing strategy comprises:
determining a weight assignment strategy according to a type tag of the video; and
performing one or more of the following operations according to the weight assignment strategy:
increasing a weight of each close-up image frame according to the weight assignment strategy;
increasing a weight of each facial expression image frame according to the weight assignment strategy; or,
increasing a weight of each wide-angle image frame according to the weight assignment strategy.

6. A video processing apparatus, comprising:
a processor; and
a memory coupled to the processor and storing instructions that when executed by the processor, cause the processor to:
perform semantic analysis on subtitles of a video to acquire compressed subtitles;
determine a weight of each frame of images in the video based on a preset image processing strategy;
acquire a shortened video images by extracting a plurality of image frames in an order of the weights of all frames of images from high to low, according to a preset video shortening proportion; and
generate a shortened video according to the shortened video images and the compressed subtitles,
wherein the memory further storing instructions that when executed by the processor, cause the processor to:
adjust the weight of each frame of images according to video playing behavior information of a user, and re-generate the shortened video images according to all the image frames after the weight of each frame of images is adjusted, so as to update the shortened video; or
adjust a weight of each image frame through an item-based collaborative filtering algorithm and a machine learning algorithm, and generating the shortened video images according to all the image frames after the weight of each frame of images is adjusted, so as to update the shortened video; or
acquire playing behavior information of a user on videos with a same type tag, and updating the weight assignment strategy of the user on the videos with the same type tag according to the playing behavior information of the user, adjust a weight of each image frame in the videos with the same type tag according to the updated weight assignment strategy, and generate a user personalized shortened video images according to all the image frames after the weight of each frame of images is adjusted, so as to generate a user personalized shortened video.

7. A video processing apparatus, comprising:
a processor; and
a memory coupled to the processor and storing instructions that when executed by the processor, cause the processor to:
perform semantic analysis on subtitles of a video to acquire compressed subtitles;
determine a weight of each frame of images in the video based on a preset image processing strategy;
acquire a shortened video images by extracting a plurality of image frames in an order of the weights of all frames of images from high to low, according to a preset video shortening proportion; and
generate a shortened video according to the shortened video images and the compressed subtitles,
wherein the memory further storing instructions that when executed by the processor, cause the processor to:
update a weight assignment strategy for a type of users, according to playing behavior information of the type of users on one of a same video and videos with a same type tag;
adjust a weight of each image frame in all videos having the same type tag which corresponds to the one of the same video and the videos with the same type tag, according to a updated weight assignment strategy; and
generate a user type personalized shortened video images according to all the image frames after the weight of each frame of images is adjusted, so as to generate a user type personalized shortened video.

8. The video processing apparatus according to claim 7, wherein the memory further storing instructions that when executed by the processor, cause the processor to:
determine watching preferences of users by collecting the playing behavior information of the users;
determine similarities among the users according to the watching preference information of the users; and
determine the users with a similarity which exceeds a preset threshold as the same type of users.

9. A non-transitory computer-readable storage medium storing computer instructions which, when executed by a processor, cause the processor to:
perform semantic analysis on subtitles of a video to acquire compressed subtitles;
determine a weight of each frame of images in the video based on a preset image processing strategy;
acquire a shortened video images by extracting a plurality of image frames in an order of the weights of all frames of images from high to low, according to a preset video shortening proportion; and
generate a shortened video according to the shortened video images and the compressed subtitles,
wherein the non-transitory computer-readable storage medium stores computer instructions which, when executed by a processor, cause the processor to:
adjust the weight of each frame of images according to video playing behavior information of a user, and re-generate the shortened video images according to all the image frames after the weight of each frame of images is adjusted, so as to update the shortened video; or
acquire playing behavior information of a user on videos with a same type tag, and updating the weight assignment strategy of the user on the videos with the same type tag according to the playing behavior information of the user, adjust a weight of each image frame in the videos with the same type tag according to the updated weight assignment strategy, and generate a user personalized shortened video images according to all the image frames after the weight of each frame of images is adjusted, so as to generate a user personalized shortened video.

10. The video processing method according to claim 1, wherein the generating a shortened video comprises: determining a position of each image frame of the shortened video images in an original video time axis; determining positions of original subtitles corresponding to each compressed subtitle in the original video time axis; and synchronizing a playing progress of the shortened video images with that of the compressed subtitles according to the original video time axis, to generate the shortened video.

11. The video processing apparatus according to claim 5, wherein generating a shortened video comprises: determining a position of each image frame of the shortened video images in an original video time axis; determining positions of original subtitles corresponding to each compressed subtitle in the original video time axis; and synchronizing a playing progress of the shortened video images with that of the compressed subtitles according to the original video time axis, to generate the shortened video.

12. The non-transitory computer-readable storage medium according to claim 9, wherein generating a shortened video comprises: determining a position of each image frame of the shortened video images in an original video time axis; determining positions of original subtitles corresponding to each compressed subtitle in the original video time axis; and synchronizing a playing progress of the shortened video images with that of the compressed subtitles according to the original video time axis, to generate the shortened video.

\* \* \* \* \*